(12) United States Patent
Nadooshan et al.

(10) Patent No.: US 8,259,950 B2
(45) Date of Patent: *Sep. 4, 2012

(54) METHOD FOR SECURE KEY MANAGEMENT USING MULTI-THRESHOLD SECRET SHARING

(75) Inventors: Mehrdad Nadooshan, New York, NY (US); Jian Ren, Middletown, NJ (US)

(73) Assignee: Avaya Inc., Basking Ridge, NJ (US)

( * ) Notice: Subject to any disclaimer, the term of this patent is extended or adjusted under 35 U.S.C. 154(b) by 3 days.

This patent is subject to a terminal disclaimer.

(21) Appl. No.: 12/834,539

(22) Filed: Jul. 12, 2010

(65) Prior Publication Data

US 2010/0272266 A1  Oct. 28, 2010

Related U.S. Application Data

(63) Continuation of application No. 10/061,032, filed on Jan. 29, 2002, now Pat. No. 7,787,619.

(51) Int. Cl.
*H04L 29/06* (2006.01)
*H04L 9/32* (2006.01)
*H04L 9/00* (2006.01)
*H04L 9/08* (2006.01)
(52) U.S. Cl. ........... 380/278; 380/45; 380/286; 713/180
(58) Field of Classification Search ................. None
See application file for complete search history.

(56) References Cited

U.S. PATENT DOCUMENTS 5,764,767 A * 6/1998 Beimel et al. ................. 713/180
5,892,937 A * 4/1999 Caccavale ..................... 711/135
6,088,454 A * 7/2000 Nagashima et al. .......... 380/286
6,182,214 B1   1/2001 Hardjono
2002/0087865 A1 * 7/2002 Eskicioglu .................... 713/180
2003/0002668 A1 * 1/2003 Graunke et al. ............... 380/45

OTHER PUBLICATIONS

Shamir, Adi, "How to Share a Secret", "Communications of the Association for Computing Machinery XP000565227", Nov. 1, 1979, pp. 612-613, vol. 22, No. 11, Publisher: Associaton for Computing Machinery, Published in: US.

(Continued)

*Primary Examiner* — Shin-Hon Chen

(57) ABSTRACT

A method and apparatus are disclosed for managing components of a secret key according to a secret sharing scheme. The disclosed secret sharing scheme divides a secret value, R, into n secret components $(R_1, R_2, \ldots, R_n)$ and one super component, S, in such a way that R can be computed from (i) any k or more $R_1$ components (k<n); or (ii) S and any one component of $R_j$. The secret components $(R_1, R_2, \ldots, R_n)$ are distributed to a number of authorized users. A multiple threshold secret sharing scheme assigns various users in a group into one of a number of classes. Each user class has a corresponding threshold level that indicates the number of users that must come together with their assigned components to obtain access to the shared secret. The multiple threshold scheme divides the secret into n components each having an assigned threshold level (i.e., the number of such components that are required to obtain the secret). Any component having a lower threshold level can satisfy the role of a component having a higher threshold level. The multiple threshold scheme provides a hierarchical scheme that allows the secret, R, to be shared among different groups of people with different thresholds.

9 Claims, 3 Drawing Sheets

OTHER PUBLICATIONS

Padro et al, "Secret sharing schemes with bipartite access structure", "IEEE Transactions on Information Theory XP002248682", Nov. 2000, pp. 2596-2604, vol. 46, No. 7, Publisher: IEEE, Published in: US.

Morillo et al, "Weighted threshold secret sharing schemes", "Information Processing Letters XP001162709", Jun. 21, 1999, pp. 211-216, vol. 70, No. 5, Publisher: Elsevier Science BV, Published in: NL.

Bayaa, Hassan, "CA Application No. 2,474,736 Office Action Jan. 8, 2009", , Publisher: CIPO, Published in: CA.

Bayaa, Hassan, "CA Application No. 2,474,736 Office Action Feb. 15, 2010", , Publisher: CIPO, Published in: CA.

Bayaa, Hassan, "CA Application No. 2,474,736 Office Action Feb. 3, 2006", , Publisher: CIPO, Published in: CA.

Bayaa, Hassan, "CA Application No. 2,474,736 Office Action Mar. 5, 2007", , Publisher: CIPO, Published in: CA.

Holper, Georges, "EP Application No. 02773486.2 Office Action Feb. 17, 2010", , Publisher: EPO, Published in: EP.

Holper, G., "PCT Application No. PCT/US 02/29754 International Search Report Aug. 4, 2003", , Publisher: PCT, Published in: PCT.

Chen, Shin Hon, "U.S. Appl. No. 10/061,032 Notice of Allowance Apr. 14, 2010", , Publisher: USPTO, Published in: US.

Chen, Shin Hon, "U.S. Appl. No. 10/061,032 Examiner's Answer to Appeal Brief Nov. 27, 2006", , Publisher: USPTO, Published in: US.

Chen, Shin Hon, "U.S. Appl. No. 10/061,032 Examiner's Answer to Appeal Brief Jul. 12, 2007", , Publisher: USPTO, Published in: US.

Chen, Shin Hon, "U.S. Appl. No. 10/061,032 Examiner's Answer to Appeal Brief Sep. 15, 2008", , Publisher: USPTO, Published in: US.

Chen, Shin Hon, "U.S. Appl. No. 10/061,032 Office Action Jan. 19, 2006", , Publisher: USPTO, Published in: US.

Chen, Shin Hon, "U.S. Appl. No. 10/061,032 Office Action Jun. 27, 2005", , Publisher: USPTO, Published in: US.

Shaw, Dale M., "U.S. Appl. No. 10/061,032 Order Remanding Appeal to Examiner Jul. 29, 2008", , Publisher: USPTO, Published in: US.

* cited by examiner

METHOD FOR SECURE KEY MANAGEMENT USING MULTI-THRESHOLD SECRET SHARING

CROSS REFERENCE TO RELATED APPLICATIONS

This application is a continuation of U.S. patent application Ser No. 10/061,032, which was filed on Jan. 29, 2002.

FIELD OF THE INVENTION

The present invention relates generally to key management techniques, and more particularly, to methods and apparatus for sharing a secret key among a number of users.

BACKGROUND OF THE INVENTION

Secret sharing techniques permit secure key management by dividing a secret key into a number of key components, which are then distributed to different people within a group. Thereafter, certain subsets of individuals within the group can combine their key components to recover the key. Secret sharing has proved to be very useful in many cryptographic systems and applications other than cryptographic key management, such as system access control and digital signatures. Secret sharing provides a tradeoff between secrecy and reliability, rather than between safety and convenience as with physical locks. Secret sharing schemes are ideally suited to applications in which a group of mutually suspicious individuals with conflicting interests must cooperate. For a more detailed discussion of secret sharing techniques, see, for example, B. Blakley et al., "Threshold Schemes With Disenrollment," Advances in Cryptology—CRYPTO '92, Lecture Notes in Computer Science, 540-548 (1993); or A. Shamir, "How to Share a Secret," Communications of the ACM, Vol. 24, No. 11, 612-613 (November 1979), each incorporated by reference herein.

With the increasing utilization of the Internet, the number of applications that can exploit secret sharing techniques has also increased, such as electric voting and broadcast systems where a minimum attendance is required. In some cases, the individual components of the larger secret key may be equally important. In other cases, however, some individual components of the larger secret may be more important than other components. Conventional secret sharing techniques, however, treat all of the individual components of the larger secret, as well as the holders of such components, in the same manner. A need therefore exists for an improved secret sharing technique that provides additional flexibility for managing the individual components of the larger secret. A further need exists for a secret sharing technique that provides hierarchical access to the individual components of the larger secret to thereby share the secret among different groups of people with different thresholds. Yet another need exists for a secret sharing technique that allows a weight or importance to be assigned to each individual component of the larger secret.

SUMMARY OF THE INVENTION

Generally, a method and apparatus are disclosed for managing components of a secret key according to a secret sharing scheme. The disclosed secret sharing scheme divides a secret value, R, into n secret components $(R_1, R_2, \ldots, R_n)$ and one super component, S, in such a way that R can be computed from (i) any k or more $R_i$ components (k<n); or (ii) S and any one component of $R_j$. The secret components $(R_1, R_2, \ldots, R_n)$ are distributed to a number of authorized users. The secret value, R, cannot be determined from any k−1 or fewer components.

A multiple threshold secret sharing scheme is also disclosed that assigns various users in a group into one of a number of classes. Each user class has a corresponding threshold level that indicates the number of users that must come together with their assigned components to obtain access to the shared secret. The multiple threshold scheme divides the secret into n components each having an assigned threshold level (i.e., the number of such components that are required to obtain the secret). Any component having a lower threshold level can satisfy the role of a component having a higher threshold level.

The present invention thus optionally allows a weight or threshold level to be assigned to each individual component of the larger secret, R., to establish a multiple threshold secret sharing scheme. The multiple threshold scheme provides a hierarchical scheme that allows the secret, R, to be shared among different groups of people with different thresholds. Thus, a different number of components may be required to recover the secret based on the threshold level within the hierarchy.

A more complete understanding of the present invention, as well as further features and advantages of the present invention, will be obtained by reference to the following detailed description and drawings.

DETAILED DESCRIPTION

A (k, n)-threshold secret sharing scheme is disclosed where a secret value, R, is shared by dividing the secret value, R, into n secret components $(R_1, R_2, \ldots, R_n)$ and one super component, S, in such a way that R can be computed from (i) any k or more $R_i$ components (k<n); or (ii) S and any one component of $R_j$. Thus, any k−1 or fewer components, $R_j$, leaves R undetermined (in the sense that all its possible values are equally likely). The value, S, is a super component, so that the shared secret can he recovered from the super component value, S, and any one key component, $R_j$.

According to another aspect of the invention, a multiple threshold secret sharing scheme is disclosed that assigns various users in a group into one of a number of classes. Each user class has a corresponding threshold level that indicates the number of users that must come together with their assigned components to obtain access to the shared secret, R. A secret, R, is divided into n components each having an assigned threshold level (i.e., the number of such components that are required to obtain the secret, R). For example, a multiple threshold secret sharing scheme can be established where a total of seven users are divided into two classes of users. A first class of users, assigned to Threshold Level 3, is allowed to obtain the secret, R, provided three (3) components from Threshold Level 3 are available. A second class of users, assigned to Threshold Level 5, is allowed to obtain the secret, R, provided five (5) components from Threshold Level 5 (or a lower threshold level) are available. It is noted that any of the Threshold 3 users can serve as a Threshold 5 user. A secret component that is in a smaller threshold category (such as Threshold 3) always has a higher importance or weight and can be used as a secret component in a larger threshold category (such as Threshold 3).

Mathematically, an exemplary multiple threshold scheme having two threshold levels (i and j), includes an (i, n)-threshold secret sharing scheme (where $1<i\leq k$) and a (j, m)-threshold secret sharing scheme (where $j\leq m\leq n$). The (i, n)-threshold secret sharing scheme shares the secret value, R, in such a way that all i components of the secret are also the secret components for the (j, m)-threshold secret sharing scheme whenever $i\leq j\leq k$.

Figure 1:
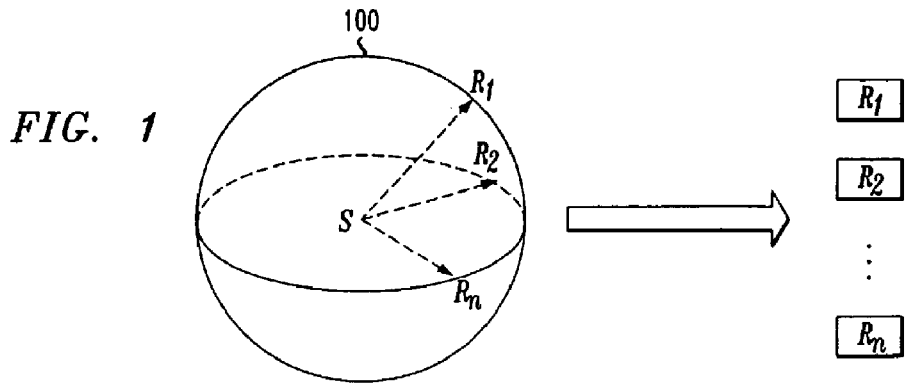
FIG. 1 illustrates the generation of the n secret components $(R_1, R_2, \ldots R_n)$ for a (k, n)*-threshold secret sharing scheme in accordance with the present invention.

FIG. 1 illustrates the generation of the n secret components $(R_1, R_2, \ldots, R_n)$ for a (k, n)*-threshold secret sharing scheme in accordance with the present invention. As shown in FIG. 1, the super secret component, S, is at the center of a sphere 100. Let $$(x_1-a_1)^2+(x_2-a_2)^2+\ldots+(x_{k-1}-a_{k-1})^2=R, \quad (1)$$

where the addition and multiplication are all operations in the finite field GF(q) with prime character p.

Suppose R in equation (1) is the secret data to be shared. $R_1, R_2, \ldots, R_n$ are n points on the surface of the ball 100, and S is the center of the ball 100. Therefore, $S=(a_1, a_2, \ldots, a_{k-1})$. Thus, for a (3, 5)-threshold scheme, equation (1) is populated with (k−1=2) elements to establish a two-dimensional surface (a circle). Thus, for a (3, 5)-threshold scheme, equation (1) becomes:

$$(x_1-a_1)^2+(x_2=a_2)^2=R, \quad (1')$$

Given a particular value of R, equation (1') fully defines a circle. The 5 users in the (3, 5)-threshold scheme, corresponding to a Threshold Level 3, are issued components selected from the surface defined by equation (1').

To build a (4, 7)-threshold scheme on top of this (3, 5)-threshold scheme, equation (1) is populated with (k−1=3) elements to establish a three-dimensional surface (a sphere). Thus, for a (4, 7)-threshold scheme, equation (1) becomes:

$$(x_1-a_1)^2+(x_2-a_2)^2+(x_3-a_3)^2=R, \quad (1'')$$

Given the same value of R as in the (3, 5) scheme, equation (1'') fully defines a sphere. In this example, the five users in the (3, 5)-threshold scheme are also part of the (4, 7) scheme with the third coordinate being zero (0). The additional two users in the (4, 7) scheme who are not members of Threshold Level 3 are issued components selected from the surface of the sphere defined by equation (1'') that are not on the surface defined by equation (1').

Figure 2:
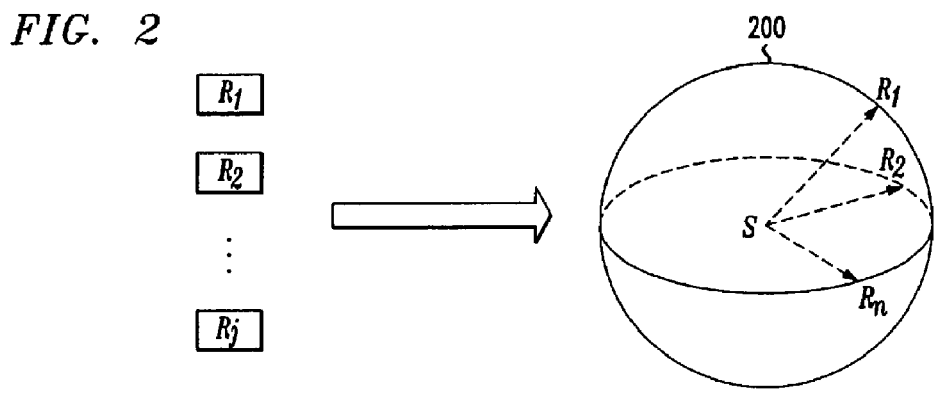
FIG. 2 illustrates the recovery of the secret value, R, in a (j, n)-scheme, where $1 < j \leq k$, from S and any one of the n secret components $(R_1, R_2, \ldots, R_n)$ in accordance with the present invention.

FIG. 2 illustrates the recovery of the secret value, R, in a (j, m)-scheme, where $j\leq k$ k, from (i) any j components of the secret, R, or (ii) S and any one of the n secret components $(R_1, R_2, \ldots, R_n)$ in accordance with the present invention. Given the j secret components $(R_1, R_2, \ldots, R_j)$, equation (1) can be solved for R.

The present invention thus provides a new secret sharing scheme, referred to herein as a (k, n)*-scheme, in that it has the following properties:

1. Knowledge of any k or more pieces of $R_i$, makes R easily computable (as shown in FIG. 2);
2. Knowledge of any k−1 or fewer pieces of $R_i$ leaves R completely undetermined (in the sense that all its possible values are equally likely);
3. R can be shared among different groups of people with different thresholds. The secret component, $R_i$, that is in a smaller threshold category always has a higher importance and can be used as a secret component in a larger threshold category;
4. Knowledge of S and any one of $R_i$ makes R easily computable (it is noted that if S is an offset as described in conjunction with FIG. 3, then $R_i$, should be replaced by the slice pass through O');
5. Conventional secret sharing schemes are a special case of the present invention;
6. The size of each component does not exceed the size of the original data when compared to the mechanical locks and key solutions;
7. When k is fixed, $R_i$, components can be dynamically added or deleted (e.g., when individuals join or leave a company) without affecting the other $R_i$ components.

The present invention is based on the fact that any k points, for example, $x_1=(x_{11}, x_{12}, \ldots, x_{1,k-1}), x_2=(x_{21}, x_{22}, \ldots x_{2,k-1}), \ldots, x_{k=(xk1}, x_{k2}, \ldots, x_{k,k-1})$, on the surface of a (k−1)-dimension ball in equation (1) can uniquely determine one and only one ball.

The above claim can be proved by solving the following system of equations:

$$(2)$$
$$\begin{cases} (x_{11}-a_1)^2+(x_{12}-a_2)^2+\ldots+(x_{1,k-1}-a_{k-1})^2=R & (2.1) \\ (x_{21}-a_1)^2+(x_{22}-a_2)^2+\ldots+(x_{2,k-1}-a_{k-1})^2=R & (2.2) \\ \ldots \\ (x_{k1}-a_1)^2+(x_{k2}-a_2)^2+\ldots+(x_{k,k-1}-a_{k-1})^2=R & (2.k) \end{cases}$$

where $a_1, a_2, \ldots, a_{k-1}$ and R are unknown in linear system of equations (2).

By subtracting equation (2.1) from equations (2.2) through (2.k), the following equation systems are obtained with $a_1, a_2, \ldots, a_{k-1}$ as unknowns:

$$(3)$$
$$\begin{cases} 2(x_{11}-x_{12})a_1+\ldots+2(x_{1,k-1}-x_{2,k-1})a_{k-1}=\sum_{i=1}^{k-1}(x_{1i}^2-x_{2i}^2) & (3.1) \\ 2(x_{11}-x_{31})a_1+\ldots+2(x_{1,k-1}-x_{3,k-1})a_{k-1}=\sum_{i=1}^{k-1}(x_{1i}^2-x_{3i}^2) & (3.2) \\ \ldots \\ 2(x_{11}-x_{k1})a_1+\ldots+2(x_{1,k-1}-x_{k,k-1})a_{k-1}=\sum_{i=1}^{k-1}(x_{1i}^2-x_{ki}^2) & (3.k) \end{cases}$$

Once $a_1, a_2, \ldots, a_{k-1}$ are solved from equation (3), R can be solved from any one equation in Equation systems (2). This also proves that R can be computed easily from S and any one $R_i$.

Security Analysis

It is assumed that k−1 of the n components of the secret, R, are revealed to an opponent. Similar to the above process, an equation system can be obtained. The equality system will have only k−1 equations, but with k unknowns. Without the loss of generality, it is assumed that $a_{k-1}$ is unknown. Since $a_{k-1}$ can be any possible value in the finite field GF(q), the system thus obtained has q possible solutions. Thus, there is no knowledge of R that the opponents can obtain even if they have the knowledge of k−1 components of $R_i$, and the chance for R to be any value in GF(q) is equal.

Figure 3:
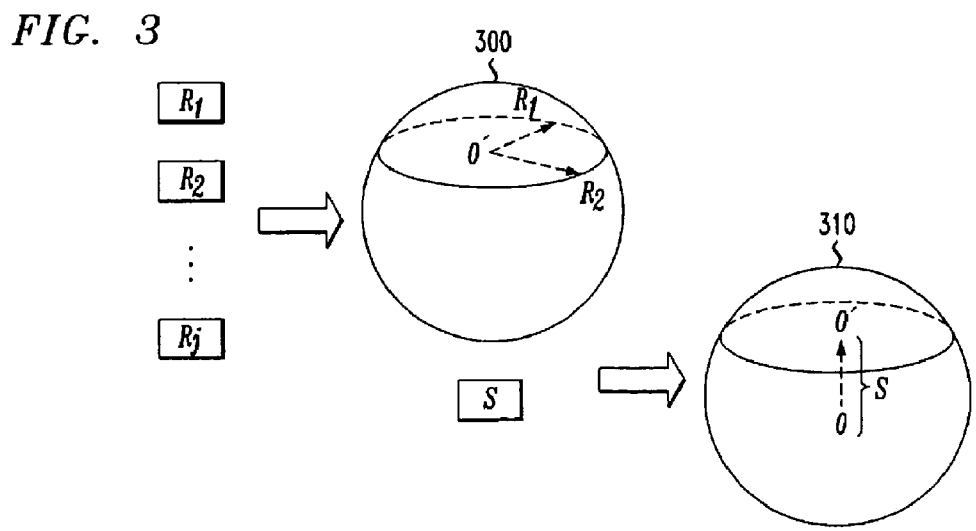
FIG. 3 illustrates the recovery of the secret, R, through the knowledge of a projection j-dimension ball (j<k), together with the knowledge of S to recover the final shared secret, R.

FIG. 3 illustrates the recovery of the secret, R, through the knowledge of a projection ball having k−1-dimensions, together with the knowledge of S to recover the final shared secret, R. The technique described in FIG. 3 can be used in cases such as broker management, discussed below. In a multi-threshold implementation, the key components are selected to be within a lower dimensional projection of the original ball, say i-dimension, i≦k to obtain an (i, n)*-threshold scheme. Thus, only p components (where p is any number between i and n) are in the same i-dimensional projective ball of the original ball in equation (1). Generally, the sphere can be sliced at different levels to recover the whole sphere. S is the distance between the center of the ball to the plane containing the points $R_1$ and $R_2$. S is the strongest data value, in that knowledge of S and knowledge of the slice O' recovers the whole sphere.

A broker manager is a collection of software and hardware components that allows for implementation of a secure identity and group membership verification of users over a network, such as an IP network. The computational model is based on a "Request/Response" mechanism. This mechanism allows for the broker to (1) listen for incoming requests over a private or public network, (2) apply the algorithm of the present invention for identify and group membership verification, and (3) pass an encrypted authorization information back to the underlying interface used by the user so that it can be utilized for any subsequent communication with entities providing services to users over an IP network. It is noted that these entities belong to the group that the user had been verified to obtain services from.

For example, a service engineer needs to obtain digital cash from his or her hank account. Meanwhile, the service engineer needs to remotely repair a problem with a voice communication system belonging to company ABC. In addition, the service engineer needs to obtain a legal paper over an automated system that requires to the user to verify his or her identify before releasing the paper to him or her. The engineer merely needs to login to the broker manager to obtain an authorization information for all the service engineer's activities mentioned above. Once the service engineer has successfully logged in and selected the entities he or she needs to interact with, the identity and group membership verification with those three organizations are done simultaneously and transparently with the engineer having no real knowledge of his or her authorization information.

EXAMPLE

Let $q=3^3$ and p=3. The 27 elements of the field $GF(3^3)$ can be expressed as:

| 0 | 1 | α |
|---|---|---|
| $\alpha^2$ | $\alpha^3 = \alpha + 2$ | $\alpha^4 = \alpha^2 + 2\alpha$ |
| $\alpha^5 = 2\alpha^2 + \alpha + 2$ | $\alpha^6 = \alpha^2 + \alpha + 1$ | $\alpha^7 = \alpha^2 + 2\alpha + 2$ |
| $\alpha^8 = 2\alpha^2 + 2$ | $\alpha^9 = \alpha + 1$ | $\alpha^{10} = \alpha^2 + \alpha$ |
| $\alpha^{11} = \alpha^2 + \alpha + 2$ | $\alpha^{12} = \alpha^2 + 2$ | $\alpha^{13} = 2$ |

-continued

| 0 | 1 | α |
|---|---|---|
| $\alpha^{14} = 2\alpha$ | $\alpha^{15} = 2\alpha^2$ | $\alpha^{16} = 2\alpha + 1$ |
| $\alpha^{17} = 2\alpha^2 + \alpha$ | $\alpha^{18} = \alpha^2 + 2\alpha + 1$ | $\alpha^{19} = 2\alpha^2 + 2\alpha + 2$ |
| $\alpha^{20} = 2\alpha^2 + \alpha + 1$ | $\alpha^{21} = \alpha^2 + 1$ | $\alpha^{22} = 2\alpha + 2$ |
| $\alpha^{23} = 2\alpha^2 + 2\alpha$ | $\alpha^{24} = 2\alpha^2 + 2\alpha + 1$ | $\alpha^{25} = 2\alpha^2 + 1$ | with the primitive polynomial $$f(x) = x^3 + 2x + 1.$$

A 2-dimension ball is defined using $$(x-a)^2 + (y-b)^2 = R. \quad (4)$$

The following four (4) points are selected as the key pieces:

$$R_1 = (1, 1) \quad R_2 = (\alpha, \alpha^4)$$

$$R_3 = (\alpha^3, \alpha^{12}) \quad R_4 = (\alpha^9, \alpha^{10})$$

It is further assumed that $R_1$, $R_2$ and $R_3$ are available. The following system of equations is obtained from equation (4):

$$(a-1)^2 + (b-1)^2 = R$$

$$(a-\alpha)^2 + (b-\alpha^4)^2 = R$$

$$(a-\alpha^3)^2 + (b-\alpha^{12})^2 = R \quad (5)$$

Following the procedure given in equation (3) to solve this system of equations, we obtain:

$$\begin{cases} 2(1-\alpha)a + 2(1-\alpha)^4 b = 1 - \alpha^2 + 1 - \alpha^8 \\ 2(1-\alpha^3)a + 2(1-\alpha^{12})b = 1 - \alpha^6 + 1 - \alpha^{24} \end{cases}$$

The following solutions are then obtained:

$$\begin{cases} a = 0 \\ b = 0 \end{cases}$$

With this solution, R equals 2 is obtained from any of the equations in equation (5). Therefore, the shared secret is 2. R equals 2 is recovered from any other three key components in a similar fashion. Thus, R equals 2 can be recovered from $R_0 = (0, 0)$ and any other single $R_i$, from equation (5).

Figure 4:
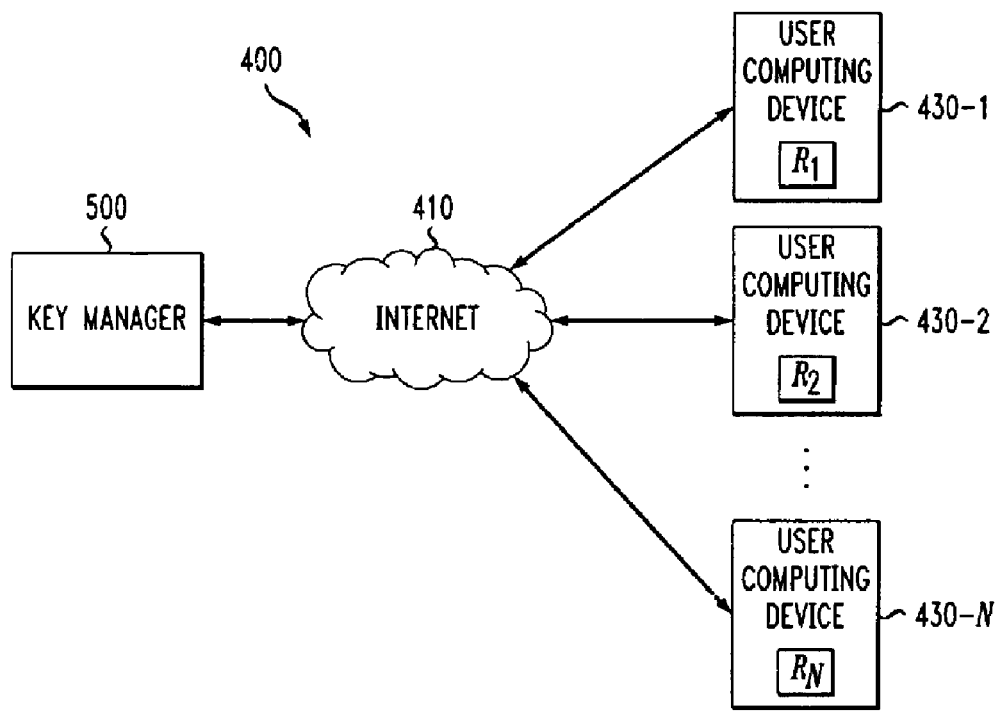
FIG. 4 illustrates an exemplary network environment where the present invention can operate.

FIG. 4 illustrates an exemplary network environment 400 where the present invention can operate. As shown in FIG. 4, a group of users each having a key component, $R_i$, and employing a user computer device 430-i, cooperate to obtain access to the complete shared secret, R, controlled by a key manager 500, discussed below in conjunction with FIG. 5, over a network 410. According to the present invention, a group of users collectively having (i) any k or more pieces of $R_i$, or (ii) knowledge of S and any one of $R_i$, makes R easily computable.

Figure 5:
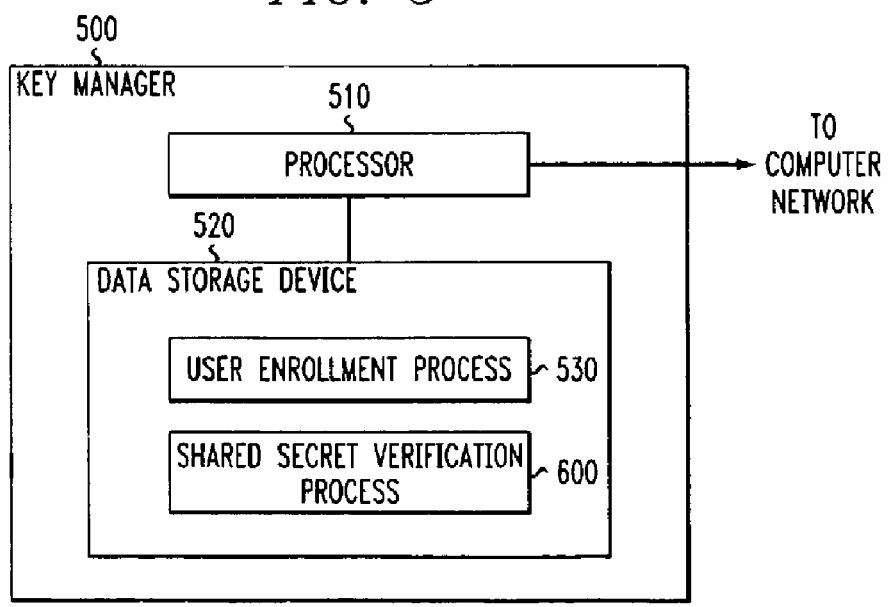
FIG. 5 is a schematic block diagram showing the architecture of an exemplary access control manager of FIG. 4.

FIG. 5 is a schematic block diagram showing the architecture of an exemplary key manager 500. The key manager 500 may be embodied as a general purpose computing system, such as the general purpose computing system shown in FIG. 5. The key manager 500 includes a processor 510 and related memory, such as a data storage device 520, which may be distributed or local. The processor 510 may be embodied as a single processor, or a number of local or distributed processors operating in parallel. The data storage device 520 and/or a read only memory (ROM) are operable to store one or more instructions, which the processor 510 is operable to retrieve, interpret and execute.

As shown in FIG. 5, the data storage device 520 contains a user enrollment process 530 that allows a user to register with the key manager 500 and controls the distribution of the key components, $R_1$, to each user. The key components, $R_1$, are generated in accordance with equation (1), in the manner described above. In a multiple threshold embodiment, each user is issued a key component, $R_1$, having an assigned threshold level (i.e., the number of such components that are required to obtain the entire secret, R). In addition, as shown in FIG. 5 and discussed further below in conjunction with FIG. 6, the data storage device 520 contains a shared secret verification process 600. The shared secret verification process 600 allows a group of users to establish their identity and obtain access to the complete shared secret, R, provided the group has (i) any k or more pieces of $R_I$, or (ii) knowledge of S and any one of $R_I$.

Figure 6:
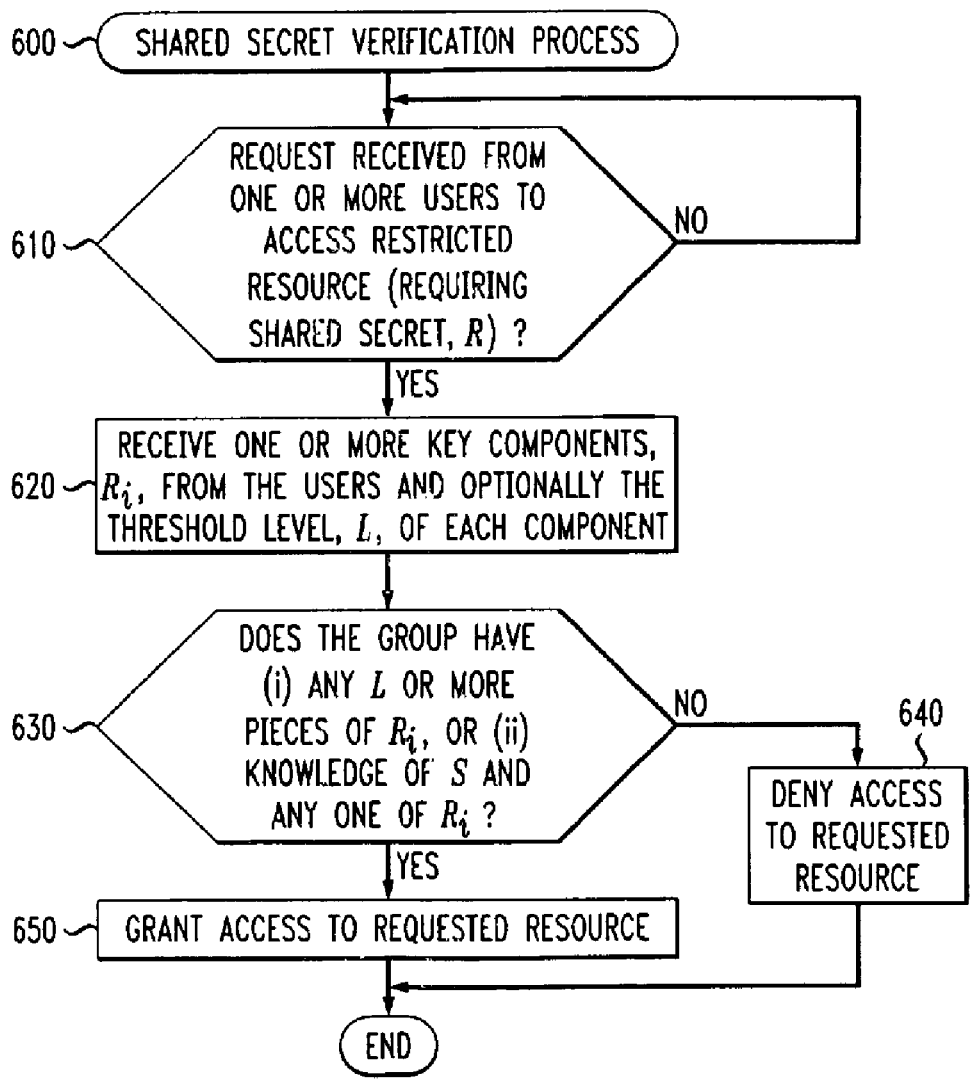
FIG. 6 is a flow chart describing an exemplary implementation of the shared secret verification process of FIG. 5 incorporating features of the present invention.

FIG. 6 is a flow chart describing an exemplary implementation of the shared secret verification process 600 incorporating features of the present invention. As previously indicated, the shared secret verification process 600 allows a group of users to establish their identity and obtain access to the complete shared secret, R, provided the group has (i) any k or more pieces of $R_I$, or (ii) knowledge of S and any one of $R_I$.

The shared secret verification process 600 is initiated during step 610 when a request is received from one or more users to access some resource that requires knowledge of the shared secret, R. Once the request is received during step 610, one or more key components, $R_I$, and, optionally, the assigned threshold levels (L), are received from the users during step 620.

A test is performed during step 630 to determine if, collectively, the group has (i) any k or more pieces of $R_I$, or (ii) knowledge of S and any one of $R_I$. If it is determined during step 630 that the group does not have (i) any L or more pieces of $R_I$, or (ii) knowledge of S and any one of $R_I$, then access to the requested resource is denied during step 640.

If, however, it is determined during step 630 that the group has (i) any k or more pieces of $R_I$, or (ii) knowledge of S and any one of $R_I$, then the group is allowed to access the requested resource during step 650. It is noted that with (i) any k or more pieces of $R_I$, or (ii) knowledge of S and any one of $R_1$, then equation (1) can be solved for R. Program control then terminates.

It is to be understood that the embodiments and variations shown and described herein are merely illustrative of the principles of this invention and that various modifications may be implemented by those skilled in the art without departing from the scope and spirit of the invention.

We claim:

1. A method comprising:
   communicating, using at least one processor, a plurality of components of a secret key to a plurality of users, each of the plurality of components having an assigned weight; and
   communicating the secret key when the assigned weights associated with the plurality of components satisfies a predefined condition.

2. The method of claim 1, wherein the plurality of components of a given weight, k, are assigned using points on a k-1 dimensional surface defined using the secret key.

3. The method of claim 2, wherein the k-1 dimensional surface is defined as follows:

$$(x_1-a_1)^2+(x_2-a_2)^2+\ldots+(x_{k-1}-a_{k-1})^2=R.$$

4. A method comprising:
   communicating, using a processor, a plurality of components of a secret key and one super-component of the secret key to a plurality of users, each of the plurality of components having an assigned weight; and
   communicating the secret key when at least one component of the plurality of components of the secret key is received and the super-component is received.

5. The method of claim 4, wherein the super-component uniquely defines a surface defined using the secret key.

6. The method of claim 4, wherein the super-component is a center of a surface defined using the secret key.

7. The method of claim 4, wherein the super-component is an offset from a center of a surface defined using the secret key.

8. A method comprising:
   communicating, using a processor, to a plurality of users a plurality of components of a shared secret, R and a super-component of R, S, where each of the plurality of components have an assigned weight; and
   upon receiving from the plurality of users at least one of (i) any one component of the plurality of components of R and the super-component of R, S, and (ii) components having a combined assigned weight above a predefined condition, communicating R to the plurality of users.

9. The method of claim 8 wherein the predefined condition does not require every component of the plurality of components to meet the predefined condition.

* * * * *